Sept. 3, 1968     C. J. LEONHART     3,399,594
PHOTOGRAPHIC MACHINE

Filed Aug. 16, 1965     10 Sheets-Sheet 1

INVENTOR
CHARLES J. LEONHART
by Mason, Kolehmainen, Rathburn & Wyss
ATTORNEYS

Fig. 6

INVENTOR
CHARLES J. LEONHART
by Mason, Kolehmainen, Rathburn and Wyss
ATTORNEYS.

Sept. 3, 1968 C. J. LEONHART 3,399,594
PHOTOGRAPHIC MACHINE
Filed Aug. 16, 1965 10 Sheets-Sheet 6

Fig. 7

INVENTOR
CHARLES J. LEONHART
by
Mason, Kolehmainen, Rathburn and Wyss
ATTORNEYS

Sept. 3, 1968  C. J. LEONHART  3,399,594
PHOTOGRAPHIC MACHINE

Filed Aug. 16, 1965  10 Sheets-Sheet 10

INVENTOR
CHARLES J. LEONHART
by
Mason, Kolehmainen, Rathburn and Wyss
ATTORNEYS.

3,399,594
PHOTOGRAPHIC MACHINE
Charles J. Leonhart, Carol Stream, Ill., assignor to The Nuarc Company, Chicago, Ill., a corporation of Illinois
Filed Aug. 16, 1965, Ser. No. 479,712
13 Claims. (Cl. 88—24)

ABSTRACT OF THE DISCLOSURE

A photographic machine has a housing with an aperture at the top. A cage supports a vacuum cover for holding film, a copyboard casing for holding copy, and a lens, and the cage is rotatable to locate either the vacuum cover or the copyboard casing at the aperture. The copyboard casing is rotatable on the cage from the copy making position to a position for loading copy. The cage includes spaced rigid frames joined by several tubular supports, and both the copyboard casing and the lens mounting frame have bearings sliding on the supports. Several spaced threaded shafts operated by knobs on a control panel move the lens and copyboard casing to adjust reproduction size and focusing. Indicators on the panel provide similar indications when focusing is correct. The lens diaphragm is adjustable by a rotatable shaft controlled from the control panel.

---

The present invention relates to photographic machines for exposing photosensitive material to a light image corresponding to an item to be copied. More particularly, the invention relates to photographic machines including a camera and copy holding apparatus rotatably arranged within a casing.

One type of photographic machine widely used in commercial applications for producing negatives or positives by a photographic process may comprise a supporting structure including a camera with a lens and film holding apparatus and copy holding apparatus mounted therein. In order that the machine may be conveniently operated by a single operator, the structure may be mounted rotatably within a casing to alternately render the film holding apparatus and the copy holding apparatus accessible in an opening in the casing. An example of this type of photographic machine may be found in the Guppy Patent No. 2,786,384, issued Mar. 26, 1957, and the present invention relates to improvements in this general type of photographic machine.

During operation of such a photographic machine, the operator customarily performs several steps including loading an item to be copied into the camera, adjusting the camera lens diaphragm to a desired aperture opening, adjusting the distance between the film and the item to be copied to achieve the desired enlargement or reduction, focusing the camera lens to obtain a clear reproduction, and loading film into the camera. In the context of the ensuing description and claims, the term film is intended to mean any photosensitive material or object exposable to light in a photographic machine or apparatus of the type to which the invention relates. In photographic macines constructed in the past, the operator, in order to perform the above-mentioned operations, is required to use various controls and apparatus positioned at widely spaced and often inconvenient locations within and around the photographic machine. It is desirable therefore to provide a photographic machine in which all of these steps could be performed with controls and apparatus conveniently available in a small area at the top of the machine.

In any photographic apparatus and particularly in apparatus designed for copying items of a graphic nature, it is important to reduce distortion to a minimum. In photographic machines having a rotatable structure, distortion may be caused by lack of rigidity in the structure in which the film, the camera lens and the copied item are mounted. Furthermore, in a machine in which the positions of the lens and of the item to be copied are adjustable with respect to the position of the film, distortion is often present due to the fact that the lens and the item to be copied are not held precisely parallel to the film. It is therefore desirable to provide a highly accurate photographic machine with a light weight but extremely rigid rotating structure and with lens and copy mounting and adjusting means designed in such a way that the lens, film and copied item are always parallel, regardless of adjustments made to their relative positions.

Since photographic machines of the type to which the invention relates have their primary application in various commercial processes, speed of operation is critical. Many photographic machines used in the past have required the time consuming process of focusing by means of a ground glass. Other past machines have provided indicators for indicating the distance between the film and the item to be copied and for indicating the position of the lens. In these machines, focusing is accomplished by means of a reference table interrelating the two indications. Thus, in such machines, for each enlargement or reduction size, as determined by the distance between the film and the copied item, there exists a lens position giving optimum focusing. In some past machines, the reference table is used to determine the correct lens position to obtain proper focusing. It is desirable to provide a focusing arrangement in which the camera may be directly focused without the use of a ground glass or a reference table.

In some photographic machines used in the past, adjustment of the distance between the film and the item to be copied is accomplished by means of complex simultaneous movement of both the film holding apparatus and the copy holding apparatus toward and away from one another. It would be advantageous to provide a simplified system through the provision of a machine in which the film holding apparatus is in a fixed location relative to the rotating support structure.

Accordingly, it is an object of the invention to provide an improved photographic machine overcoming the above discussed disadvantages of machines used in the past.

It is another object of the invention to provide an improved photographic machine of the type having a rotatable supporting structure in which the film is held in a fixed position with respect to the supporting structure.

It is yet another object of the invention to provide an improved photographic machine having a light weight and highly rigid rotatable cage structure.

It is a further object of the invention to provide a photographic machine having a control panel located on the rotatable structure adjacent the film holding apparatus whereby the camera controls and the film holding apparatus are convenient and wherein the film holding apparatus is always in the same position with respect to the operator when the rotatable cage is in the normal operating film loading position.

It is yet another object of the invention to provide an improved photographic machine wherein the camera lens diaphragm may be controlled with a control located conveniently on a control panel, and in which a novel drive linkage is provided enabling the diaphragm to be controlled in any position of the camera lens.

It is another object of the invention to provide an improved photographic machine having lens adjustment focusing apparatus for directly and exactly focusing the light image and for assuring that the lens remains parallel with the film.

It is another object to provide a photographic machine with improved supporting structure for maintaining both the lens and the item to be copied parallel with the film regardless of the positions to which they are adjusted.

It is another object to provide an improved photographic machine having controls for the position of the camera lens and the position of the copy holding apparatus and a control for the lens diaphragm, all conveniently located on a highly accessible control panel, and wherein the control panel in the camera operating position is located adjacent the position occupied by both the copy loading apparatus in the copy loading position and the film loading apparatus in the film loading position.

It is another object of the invention to provide a photographic machine having a rotatable cage equipped with a novel arrangement of support bars and slide bearings for reducing camera distortion which might be caused by adjustment of the copyboard and camera lens.

It is another object of the invention to provide an improved photographic machine indicator system for accomplishing rapid and exact focusing.

Yet another object is to provide a photographic machine including a novel and adjustable vacuum film holding arrangement.

Still another object is to provide a photographic machine of the rotatable cage type having an improved copy loading apparatus.

In brief, a photographic machine constructed in accordance with the present invention may comprise a casing and supporting structure having an opening at the top through which are accessible various parts of a rotatable cage structure. The rotatable cage is formed of a framework or latticework of lightweight but rigid materials defining an open central area in which is mounted a camera including a lens and a film holding apparatus. The film holding apparatus comprises a vacuum cover hinged to the rotatable cage and having markings and a control whereby the area of vacuum application can be matched to the size of film used. The machine is provided with controls for rotating the cage between film loading and copy loading positions, and in the film loading position the film holding apparatus is accessible through the casing opening and is always at the same height for loading, the vacuum cover being directly hinged to the cage structure.

In the copyholding position a copy holding apparatus, or copyboard, is accessible through the opening, and is mounted to rotate between operating and loading positions. The copyboard is provided with markings for centering an item to be copied in the copyboard.

The camera lens is supported by a lens mounting member, or lensboard, and both the lensboard and copyboard are mounted for movement with respect to the cage structure toward and away from the film holding apparatus whereby the size of the final reduction or enlargement is determined by the copyboard position, and focusing is accomplished by movement of the lensboard. The lensboard and the copyboard are both moved in exact and stable fashion by pairs of threaded drive screws, and are moved along supporting bars engaged by slide bearings so that position control is very accurate and so that the lens and the copied item remain parallel with the film, thus reducing camera distortion to a minimum. Furthermore, a novel indicating system is provided for focusing the lens exactly and directly for any position of the copyboard.

The adjustable cage is provided with a control panel portion near the film holding apparatus so as to be easily available in the film loading and normal operating position of the cage. Both the copyboard position control and lensboard position control, as well as the copyboard and lensboard indicators, are readily accessible on this control panel. Additionally, the camera lens includes an adjustable diaphragm which is also adjustable by a control mounted on the control panel and which, due to the provision of a drive linkage system, allows diaphragm adjustment in any lensboard position.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings in which.

Figure 1:
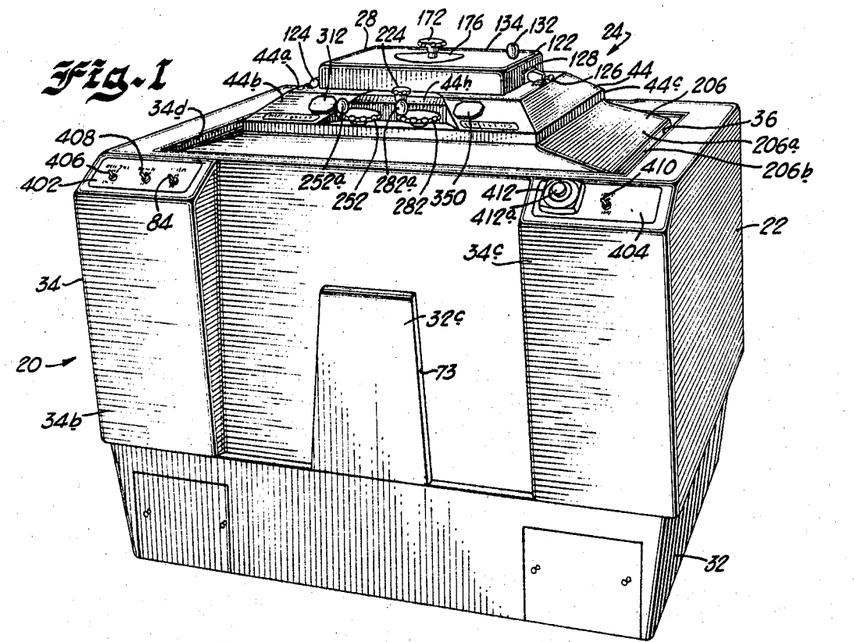
FIGURE 1 is a perspective view of a photographic machine constructed in accordance with the present invention.
Figure 2:
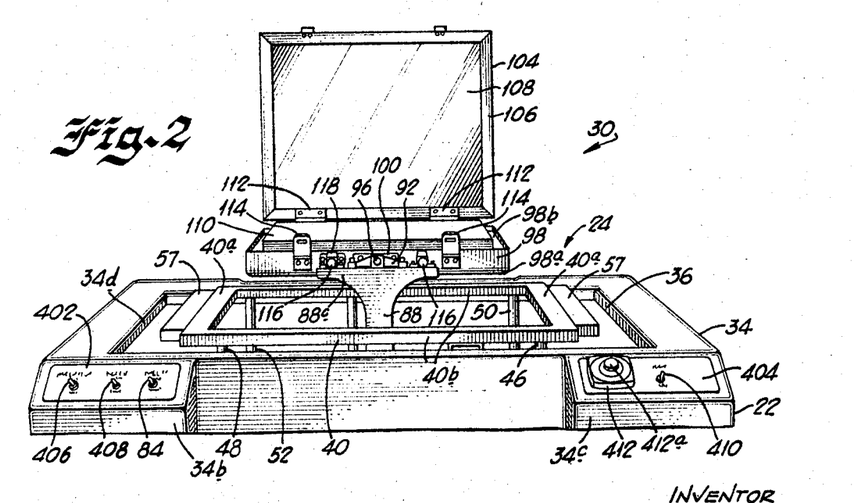
FIGURE 2 is a fragmentary perspective view showing the upper portion of the photographic machine of FIGURE 1 with the rotatable cage assembly rotated to the copy loading position and the copyboard in the loading position.
Figure 3:
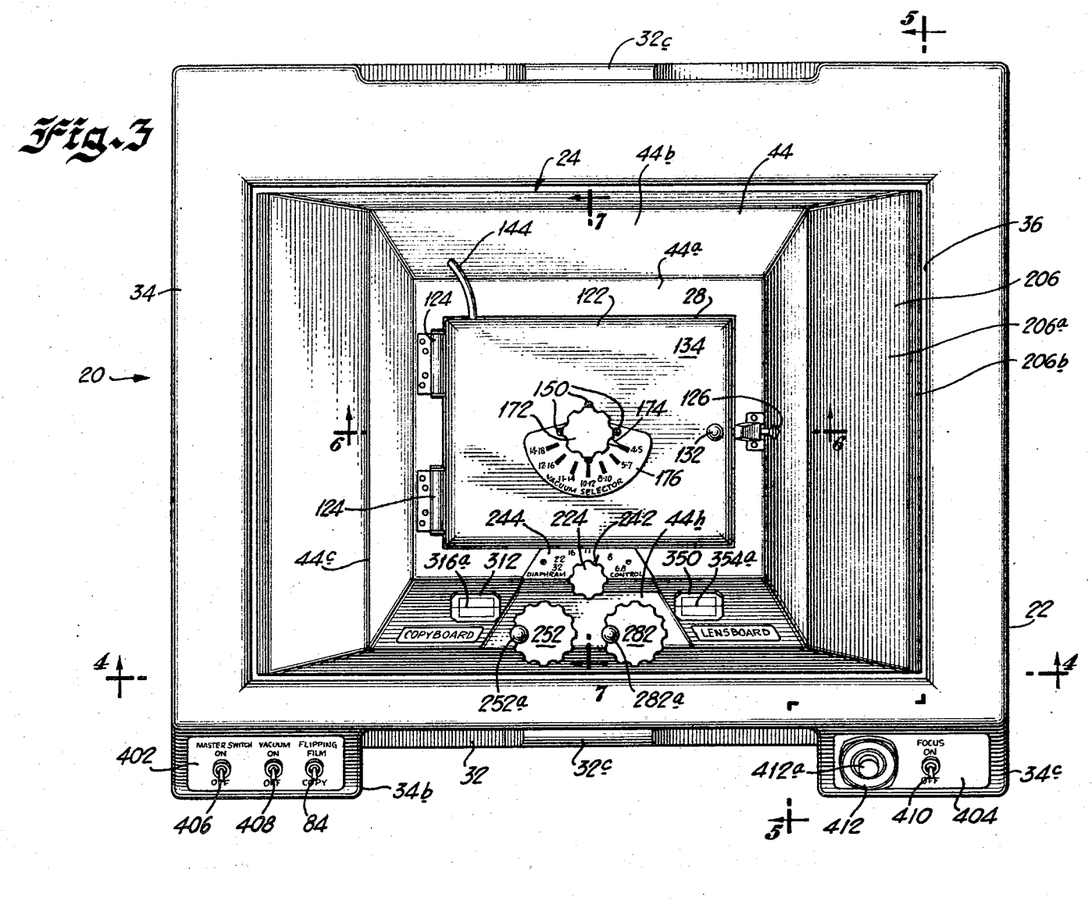
FIGURE 3 is an enlarged top plan view of the photographic machine of FIGURE 1.
Figure 4:
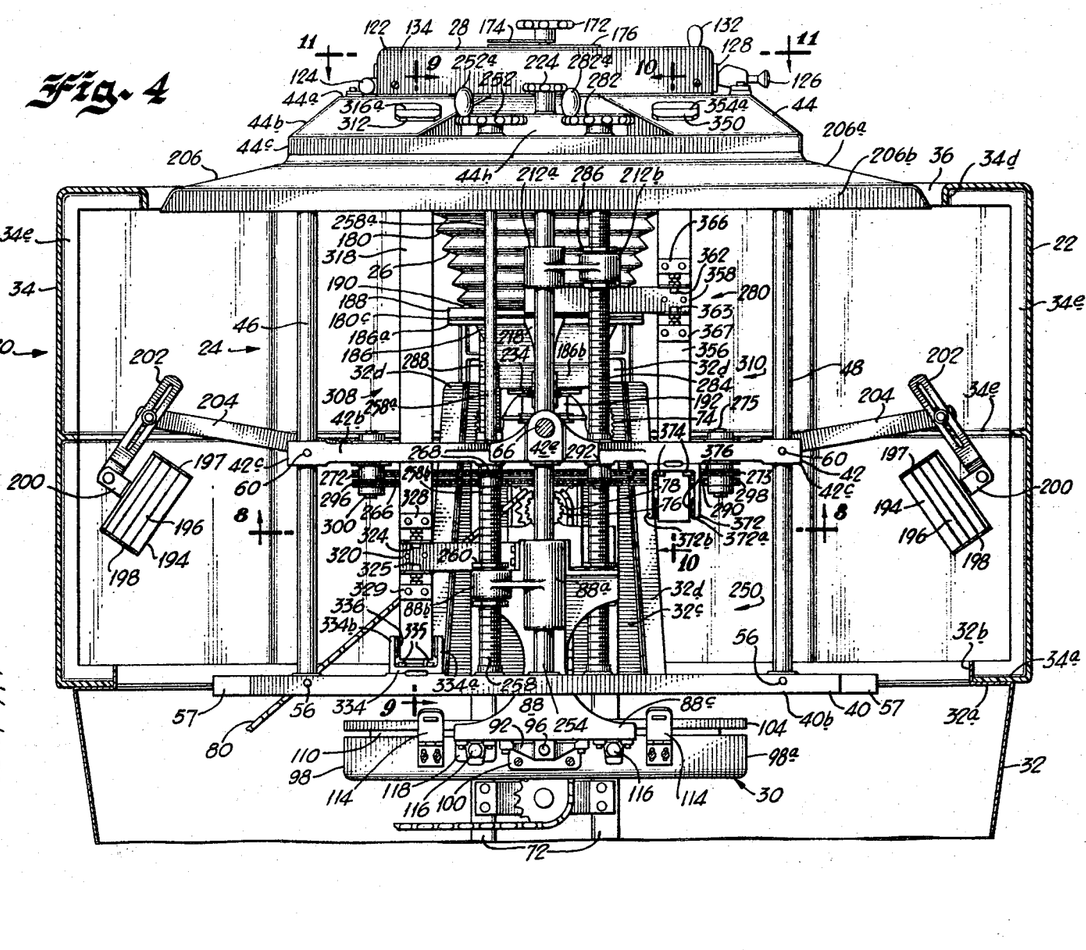
FIGURE 4 is an enlarged cross sectional view of the photographic machine taken along the line 4—4 of FIGURE 3.

Referring now to the drawings, particularly to FIG. 1, there is illustrated a photographic machine designated generally as 20 and constructed in accordance with the present invention. The machine 20 includes a housing 22 and a rotatable cage assembly generally designated as 24 (FIG. 2) adapted to rotate in the housing 22. The cage assembly 24 supports a camera 26 disposed within the casing 22, a film holding apparatus 28 which in the position shown in FIG. 4 extends out of the top of the casing 22 and a copyboard assembly generally designated as 30, which in the position shown in FIG. 4 is adjacent the bottom of the casing. In accordance with the invention, and as will be described in considerable detail hereinafter, the cage assembly 24 is rotatable between film loading and copy loading positions in order to make the film holding apparatus 28 and the copyboard 30 alternatively accessible at the top of the casing 22. In addition, the copyboard 30 is rotatably mounted so that it can be flipped from its normal position (FIGS. 4 and 5) to a copy loading position (FIG. 2) when rotated to the top of the casing 22.

Figure 5:
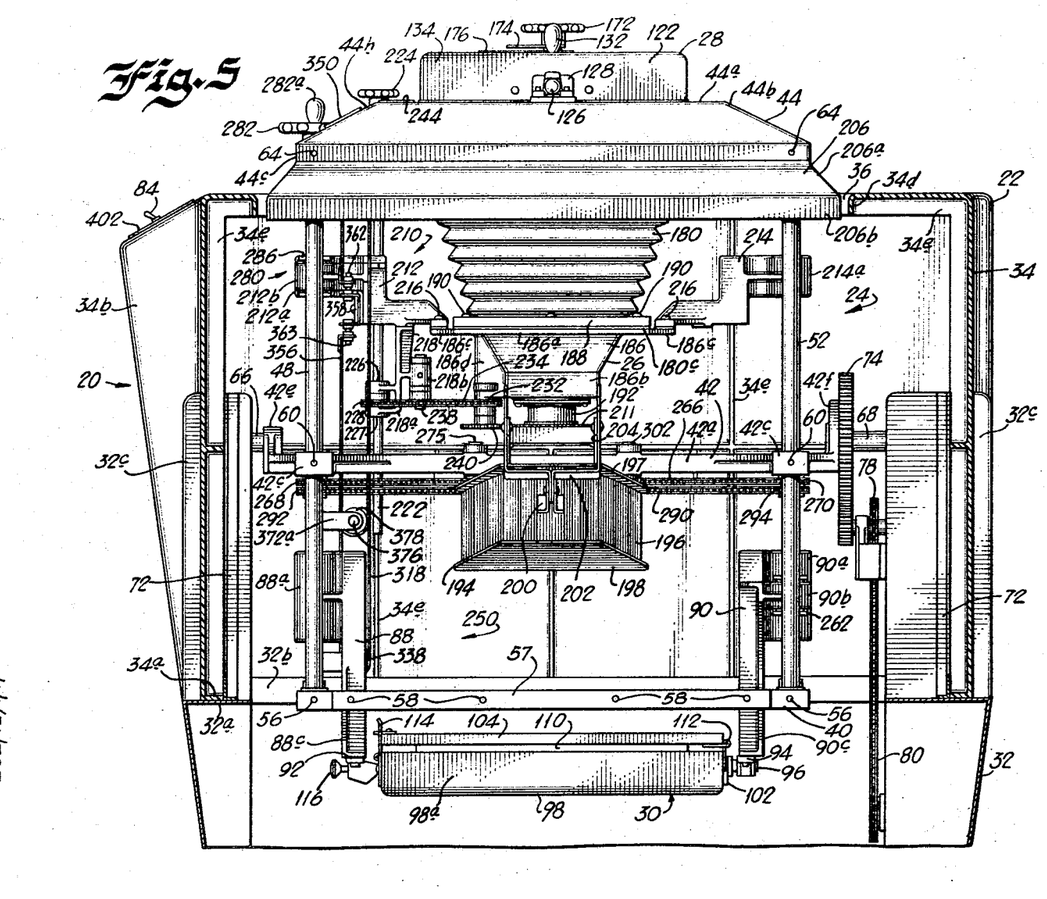
FIGURE 5 is an enlarged cross sectional view of the photographic machine taken along the line 5—5 of FIGURE 3.

In order to support the photographic machine 20, the casing 22 includes a floor stand portion 32 (FIGS. 4 and 5) comprising a generally rectangular slightly tapered shell open at the top. The top edge of the floor stand 32 includes an inwardly extending flange 32a bounded by an upwardly extending rim 32b. It should be understood that the floor stand 32 may either rest directly on a floor surface, or may be spaced therefrom by means of suitable feet or pads for damping vibrations, if desired.

The housing 22 also includes a main cabinet portion 34 resting upon the floor stand portion 32 and including at the bottom thereof an inwardly extending flange 34a supported on the inwardly extending flange 32a of the floor stand. Furthermore, the edge of the flange 34a abuts the rim 32b on the floor stand in order to position the cabinet with respect to the floor stand. The cabinet portion 32 is of a generally rectangular shape complementary with that of the floor stand, and includes at the front thereof a pair of raised control pedestal portions 34b and 34c (FIG. 1). The machinery mounted within the casing 22 is readily accessible by the operator through an enlarged opening 36 defined in the top of the cabinet portion 34 by a downwardly extending flange 34d. Although the outer surface of the cabinet portion 34 is smooth, the inner surface is provided with several reinforcing ribs 34e (FIG. 4) adding rigidity and strength.

Figure 9:
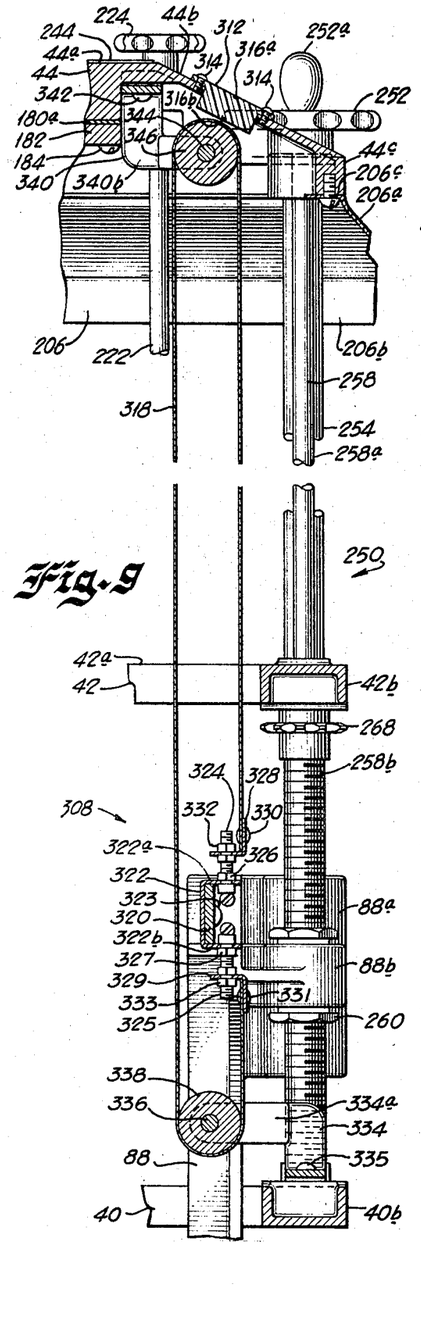
FIGURE 9 is a greatly enlarged broken fragmentary cross sectional view taken along the line 9—9 of FIGURE 4 and illustrating part of the copyboard positioning apparatus.

The cage assembly 24 rotatably mounted in the casing 22 includes a supporting framework including a first end frame 40, a center frame 42 and a second end frame 44 (FIG. 4), these being held in spaced stacked relationship by means including four corner mounted support tubes 46, 48, 50 and 52. The first end frame 40 is normally disposed at the bottom of the casing 22 and may hereafter be referred to as the bottom frame. The bottom frame 40 however may be rotated to the top of the casing to the position shown in FIG. 2, and, as there illustrated, the frame 40 is formed of a generally rectangular member including a pair of spaced side portions 40a connected by cross pieces 40b. The side members 40a and cross pieces 40b are generally channel-shaped in construction as can be seen in FIG. 9, but include several cross ribs and solid portions where desired for strength or where intersected by structure such as the tubes 46, 48, 50 and 52. The solid portions at the corners of the frame 40 as shown best in FIG. 5 include recesses formed therein for receiving the support tubes 46, 48, 50 and 52, which are held firmly in place by means of screws 56. The side members 40a of the bottom frame 40 support counterweights 57 held in place by means of screws 58 in order approximately to balance the cage assembly 24 for ease of rotation.

Figure 6:
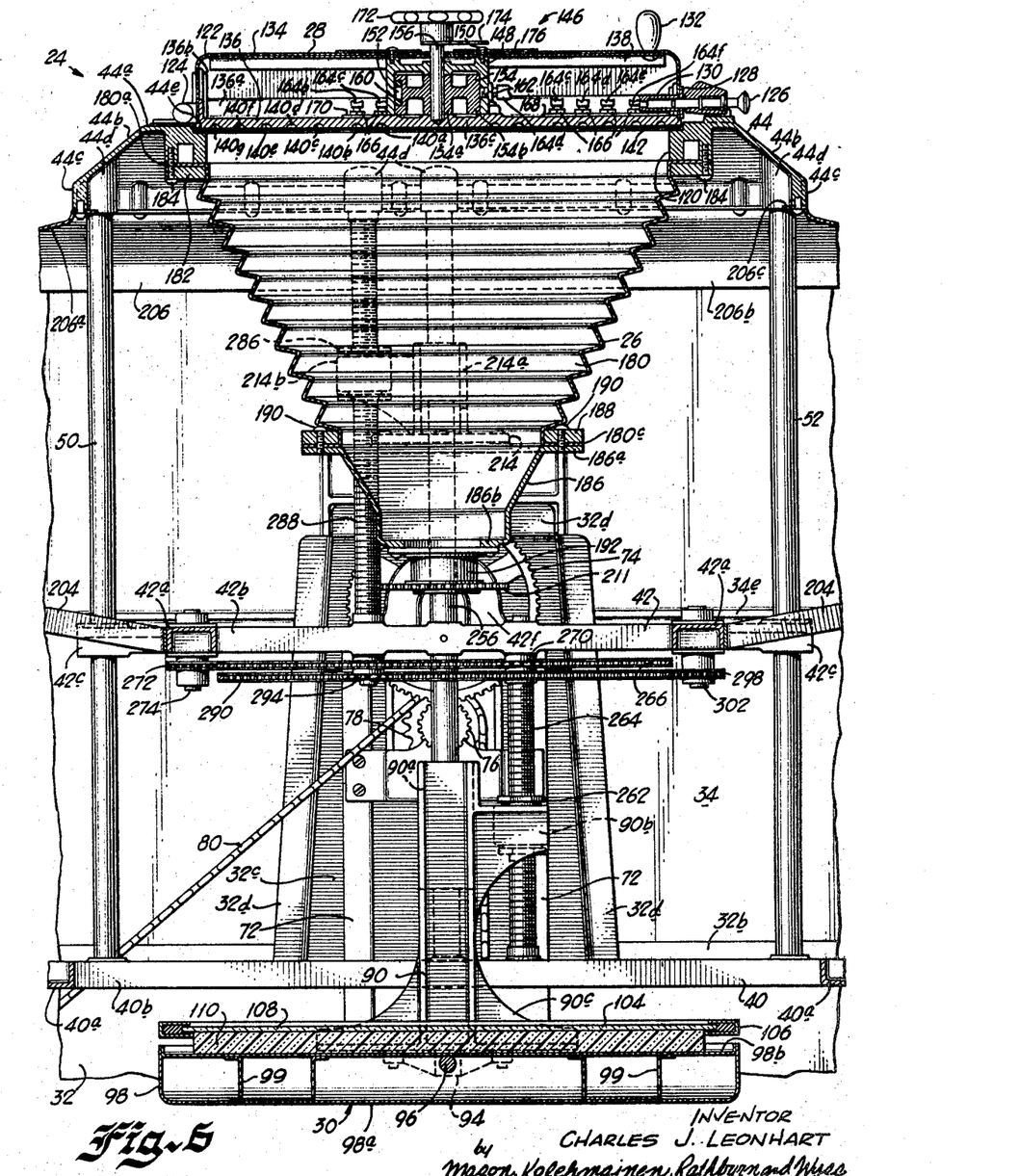
FIGURE 6 is a greatly enlarged fragmentary cross sectional view of the photographic machine taken along the line 6—6 of FIGURE 3.

The center frame 42 is somewhat similar in construction to the lower frame 40 and includes side members 42a connected by cross pieces 42b (FIG. 6). Extending feet 42c are provided at each corner of the center frame 42 and include openings for receiving the support tubes 46, 48, 50 and 52, which are held firmly in place by means of screws 60. Center frame 42 is also substantially channel-shaped in construction, including strengthening cross pieces and solid portions.

The second end frame 44 is somewhat more complex in shape than frames 40 and 42 since it not only serves as a supporting element, but also as a light shield, a control panel, and, insofar as styling is concerned, as part of the housing of the machine. Since the frame 44 is normally at the top of the machine 20, except in the copy loading position of the cage 24 shown in FIG. 2, it may hereinafter be referred to as the top frame.

The top frame 44 comprises a generally inverted saucer-shaped element including a flat generally rectangular upper portion 44a surrounded by a normally downwardly inclined portion 44b bounded by a vertical portion 44c. As can best be seen in FIGS. 6 and 7, the inclined portion 44b is relatively thin in cross-section compared with the horizontal portion 44a. At the four corners of the top frame 44 where the portion 44b intersects the portion 44c, the top frame 44 is provided with internal enlarged bosses 44d (FIG. 6) including openings for receiving the ends of the support tubes 46, 48, 50 and 52. These tubes are held in the bosses 44d by means of screws 64.

It can be seen that the frame assembly 38 comprises an extremely rigid framework of supporting pieces defining a large interior space in which is supported much of the machinery of the photographic machine. The lattice-like construction of the cage assembly 24 provides a very strong, but lightweight supporting structure. The lower frame 40, the center frame 42 and the top frame 44 may be formed of cast aluminum while the supporting tubes 46, 48, 50 and 52 may be formed of tubular steel to provide the desired strength.

To provide for rotation of the cage assembly 24 within the casing 22, the central frame 42 includes a pair of hub portions 42e and 42f on the cross pieces 42b. The hubs 42e and 42f support a pair of outwardly extending trunnion shafts 66 and 68 (FIG. 5) supported for rotation in supporting and bearing assemblies mounted in the casing and supported preferably from the floor by means of sturdy legs 72. In order to accommodate the legs 72 and the bearing assemblies, the floor stand portion 32 of housing 22 includes upwardly extending centrally located portions 32c bounded by flared lips 32d (FIG. 6). The front and rear of the cabinet portion 34 define a pair of recesses 73 engageable with the lips 32d whereby a smooth outer casing surface is presented. This arrangement makes it possible easily to remove the cabinet 34 from the floor stand 32 in order to gain access to the completely assembled cage structure 24.

As noted above, the cage assembly 24 is rotatable in the housing 22, and includes a film holding assembly 28 disposed at one end of the cage and a copyboard assembly 30 near the other end thereof. In order to photograph an item to be copied, the cage is first rotated to the copy loading position illustrated in FIG. 2 and the item to be copied is inserted into the copy holding assembly 30. Then the cage is rotated to the position shown in FIGS. 1 and 3-8, hereinafter termed the film loading and normal operating position of the cage, and a film is mounted in the film holding assembly 28.

In order to rotate the cage assembly 24, a gear 74 (FIG. 5) is mounted adjacent the hub 42f and is fixed on the shaft 68 for rotation therewith and thus with the entire cage 24. The gear 74 is driven by a pinion 76 which in turn is driven by a sprocket 78 and a driving chain 80. Furthermore, a suitable electrically actuated brake may be provided for halting the movement of the cage 24 in the alternate positions. The driving chain 80 is driven by means of an electric motor (not shown) mounted in the floor stand 32 of the photographic machine 20. In order to control the electric motor and brake and thus to control the position of the rotatable cage 38, the control pedestal 34b of the casing 22 carries a toggle switch 84 movable between two positions and the machine 20 is equipped with suitable control means for energizing the motor and brake in order automatically to rotate the cage assembly 24 to the desired position by operation of the switch 84, as will be understood by those skilled in the art.

Having reference now to the copyboard assembly 30, the copyboard is supported on the framework of the rotatable cage 24 by means of a pair of copyboard support brackets 88 and 90. The supports 88 and 90 include mounting flange portions 88c and 90c to which are mounted a pair of spaced axle mounting brackets 92 and 94 for mouting an axle 96.

The copyboard 30 is rotatable around the axle 96 between an operating position (FIGS. 4-7) and a copy loading position (FIG. 2), and includes a casing 98 including an outer dish-shaped shell 98a and a flat inner support plate 98b. Reinforcing members 99 (FIG. 7) are provided between the portions 98a and 98b to add strength and rigidity. Mounted to either side of the copyboard casing 98 are a pair of axle bearing plates 100 and 102 engaging the axle 96 for rotation of the copyboard thereabout. The copyboard includes a lid 104 having a rectangular frame 106 mounting a transparent glass plate 108 through which an item to be copied mounted in the copyboard 30 may be illuminated and be "visible" to the camera 26. In the closed position, the glass plate 108 lies against a deformable pressure back 110 formed of foam rubber, plastic, or the like and mounted against the flat inner support plate 98b. The lid 104 is pivotally mounted to the copyboard casing by means of a pair of hinges 112, and is held detachably in the closed position by means of a pair of spring latches 114.

As discussed above, the copyboard 30 is rotated from its normal position at the bottom of the machine 20 to the opening 36 in the cabinet portion 34 when the switch 84 is operated. In the normal operating position of the copyboard 30, the glass plate 108 faces inwardly toward the camera portion 26 of the rotatable cage. Accordingly, in order to allow the operator conveniently to load an item to be copied into the copyboard, the copyboard 30 may be rotated about the axle 96. In order to latch the copyboard in either the operating or the loading position, the copyboard support 88 carries a pair of pull latches 116 (FIG. 2) engageable with a latch plate 118 on the casing 98 of the copyboard 30. When the pull latches 116 are released, the operator may manually turn the copyboard to the position shown in FIG. 2, where it again is latched, and insert an item to be copied on top of the pressure back 110, and may then close the lid 104 over the copy and return the copyboard to its normal operating position.

Having reference now to the film holding apparatus 28 disposed oppositely on the cage 24 from the copyboard 30, the horizontal flat portion 44a of the frame 44 defines a generally rectangular opening 120 over which film is held to be exposed. The frame portion 44a includes a recessed ledge 44e for receiving a vacuum cover 122 which is mounted to the top frame 44 by means of hinges 124. The hinges may be of the spring biased type in order to oppose to some extent the weight of the vacuum cover as it is opened and closed. The vacuum cover 122 may be latched in its closed position against the ledge 44e by means of a spring loaded pull latch 126 cooperating with a latch plate 128 and a latch block 130 on the vacuum cover 122. Furthermore, a handle 132 is provided in order that the operator of the photographic machine 20 may pull open the vacuum cover 122 after releasing the pull latch 126.

The vacuum cover 122 includes a generally dish-shaped casing 134 mounted on a vacuum block 136 having an upwardly extending circumferential flange 136a snugly receiving the edge of the casing 134. The vacuum block 136 also includes raised hinge supporting flanges 136b opposite the hinges 124 and additionally includes a generally planar lower face 136c. A wide channel-shaped reinforcing member 138 is mounted within the casing 134 in order to provide for rigidity and strength of the vacuum cover 122.

Figure 11:
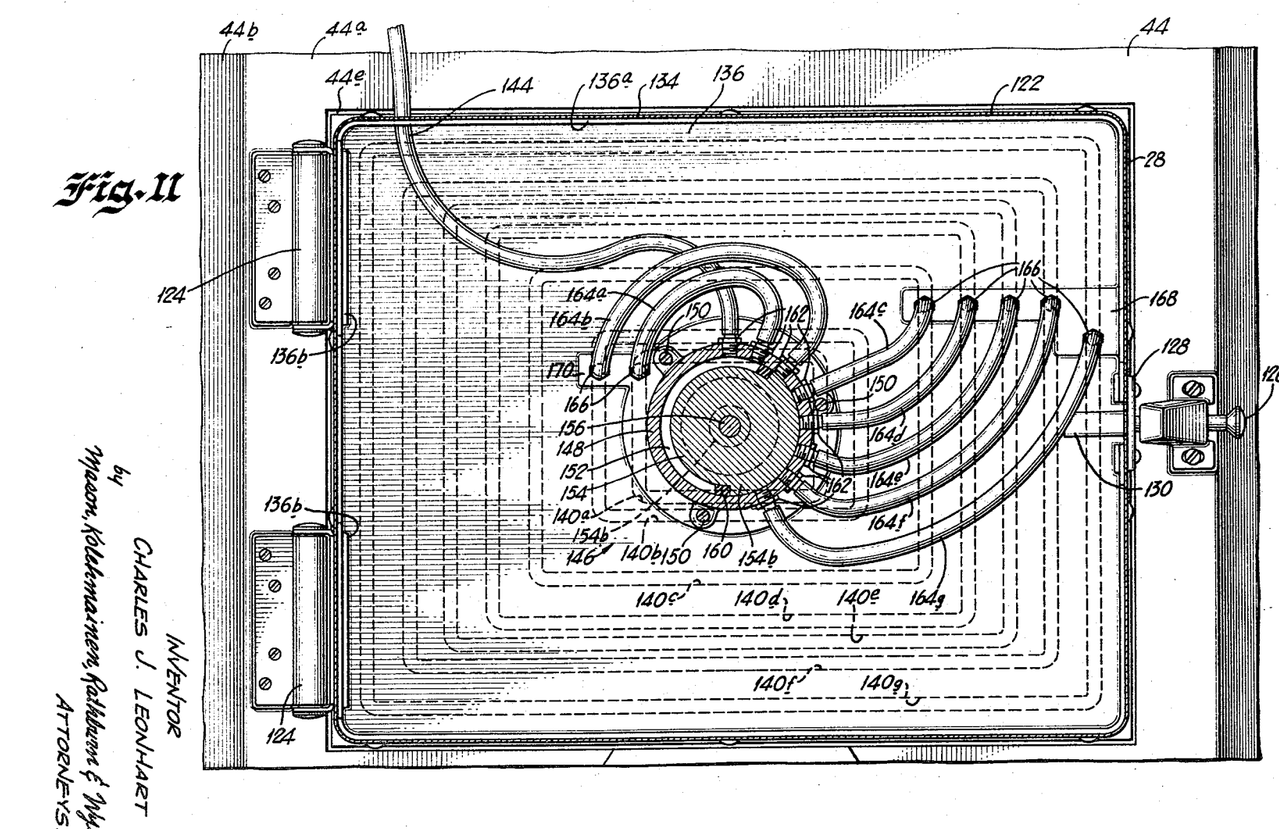
FIGURE 11 is a greatly enlarged fragmentary cross sectional view of the vacuum cover taken along the line 11—11 of FIGURE 4.

In accordance with the invention, means are provided for holding film against the underside of the vacuum cover in position to be selectively exposed by means of a light image through the camera 26 in accordance with an item to be copied mounted in the copyboard 30. Furthermore, a novel control arrangement is provided whereby a film-holding vacuum is applied in accordance with the film size used. Thus, the generally planar lower face 136c of the vacuum block 136 is provided with a series of parallel-sided generally rectangular recesses of graduated size 140a, 140b, 140c, 140d, 140e, 140f and 140g (FIG. 11). Mounted over the planar face 136c of the vacuum block 136, and thus enclosing the recesses 140a–140g, is a vacuum plate 142 including a finely spaced array of small perforations 143 (FIG. 12), many of which communicate with the recesses 140a–140g.

In order to support a film or other photosensitive material or object against the vacuum plate 142 on the underside of the vacuum cover 122, means are provided selectively to apply a vacuum within the recesses 140a–140g, which vacuum is effective at the surface of the vacuum plate 142 because of the many small perforations 143 formed therein. Thus, a suitable source of vacuum, such as an electric motor-driven vacuum pump or the like (not shown) may be positioned in the base of the photographic machine 20 and connected by means of a suitably arranged flexible vacuum conduit 144 (FIG. 11) with a vacuum controlling valve generally indicated at 146. The vacuum valve 146 is formed of a generally cup-shaped valve block 148 (FIGS. 7 and 11) mounted between the channel support 138 and the vacuum block 136 by fasteners 150. A semicircular valve chamber 152 is defined within the valve block 148 by means of a rotatable valve member 154. A normally vertically disposed valve shaft 156 is mounted for rotation in the vacuum block 136 and in the casing 134 and extends through a hub portion 154a of the valve member 154. An enlarged rim 154b closely engages the circumferential inner wall of the valve block 148, and a semicircular recess (FIG. 11) in the rim 154b serves to define the valve chamber 152. This recess carries a sealing gasket 160 to retain the suction within the chamber 152.

Disposed along a substantial portion of the outer wall of the vacuum block 148 are a series of tube fittings 162, one of which serves to connect the valving chamber 152 with the vacuum source through the vacuum conduit 144. The additional tube fittings 162 are joined with a series of vacuum conduits 164a, 164b, 164c, 164d, 164e, 164f and 164g. The other ends of the tubings 164a–g are connected to additional tube fittings 166 mounted in fitting plates 168 and 170 (FIGS. 6 and 11) formed on the rear surface of the vacuum block 136. Thus, the tube fittings 166 communicate through the vacuum block 136 with the recesses 140a–140g in the face 136c of the vacuum block 136.

Rotation of the valve body 154 by means of the shaft 156 is accomplished with a knob 172 mounted on the shaft 156 outside the vacuum cover 122. The knob cooperates (FIG. 3) with a pointer 174 and an indicator plate 176 mounted on the vacuum cover. It will readily be understood that as the valve member 154 is rotated from an off position to a full on position, vacuum will sequentially be supplied to the recesses 140a–g by means of the conduits 164a–164g. Since the recesses 140a–g are arranged in gradually increasing size, the area over which vacuum is supplied to the plate 142 may be matched with the film size used.

Figure 7:
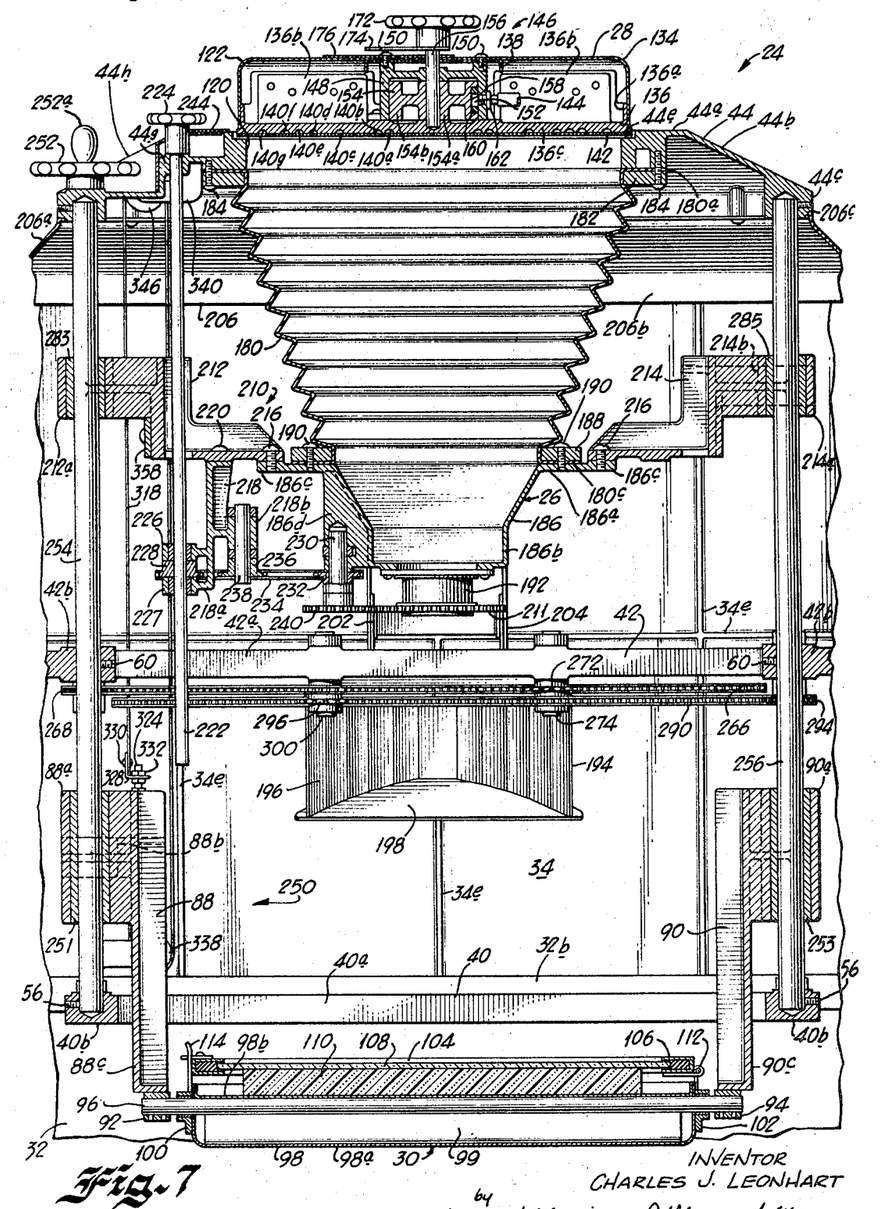
FIGURE 7 is a greatly enlarged fragmentary cross sectional view of the photographic machine taken along the line 7—7 of FIGURE 3.
Figure 8:
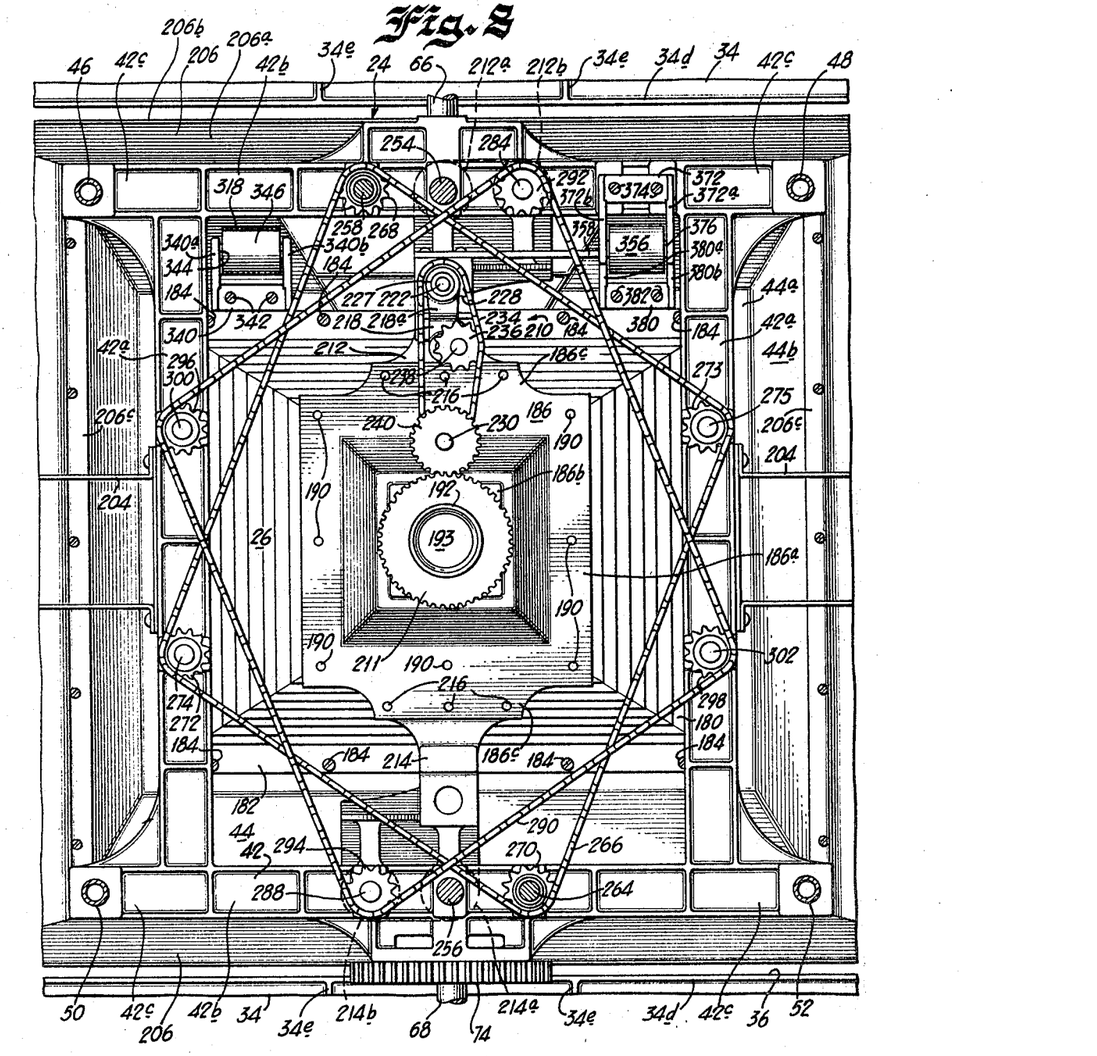
FIGURE 8 is an enlarged fragmentary cross sectional view of the photographic machine taken along the line 8—8 of FIGURE 4.

Mounted within the rotatable cage assembly 24 is the camera 26 (FIG. 7). Beneath the film holding portion 28, the camera 26 includes a collapsible light excluding bellows 180 comprising an upper mounting lip 180a mounted to the underside of the central frame portion 44a of the upper frame 44 by means of an upper clamping frame 182 held to the frame portion 44a by means of fasteners 184. The bellows 180 also includes corrugations whereby the bellows 180 may be expanded and collapsed. The bellows 180 additionally includes a lower mounting lip 180c held between a bellows mounting flange 186a on a lens mounting bracket or lensboard 186 and a lower clamping frame 188 held to the lensboard 186 by fasteners 190. The lensboard 186 includes a generally cup-shaped portion tapering to a smaller diameter lens supporting portion 186b against which is mounted a variable-aperture optical lens assembly 192, including a lens 193 (FIG. 8).

It can now be seen that when the operator has loaded an item to be copied and a film in the photographic machine 20, the item and the film will lie in interfacing relation at either end of the rotatable cage 24, and that the optical lens assembly 192 will serve to focus a light image representing the item to be copied onto the film held in the film holding assembly 28. In order to illuminate the item to be copied, a pair of light housings 194 are mounted at either side of the rotating cage 24. The housings 194 include generally parabolic-shaped reflectors 196 sandwiched between top and bottom plates 197 and 198. The back of the reflectors 196 carry mounting flanges 200 fastened to generally Y-shaped adjusting brackets 202. The brackets 202 are adjustably fastened to mounting brackets 204 which are secured to the cross pieces 42a of the central frame 42. The reflectors 196 are adapted to reflect light from suitable lamps held in the light housings 194 and are adjustable in order that the lamps may be arranged to best illuminate an item to be copied mounted in the copyboard 30.

Figure 10:
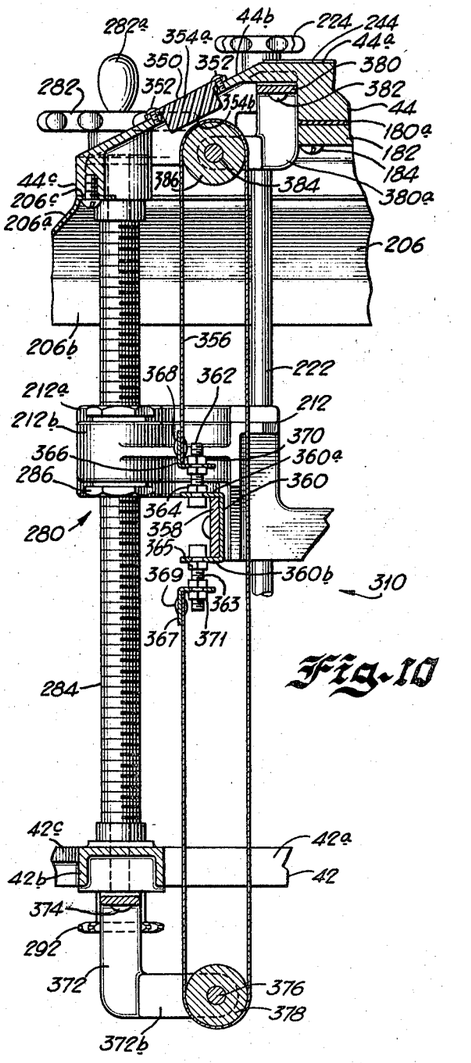
FIGURE 10 is a greatly enlarged fragmentary cross sectional view taken along the line 10—10 of FIGURE 4 and illustrating part of the lensboard positioning apparatus.

Since the photographic machine 20 is adapted to be used under darkroom conditions where it is desirable to prevent light from the light housings 194 from escaping the interior of the photographic machine 20, the top frame 44 of the rotatable cage 24 is designed to act as a light shield in combination with a light baffle 206 including a gently inclined sloping portion 206a and a more steeply inclined portion 206b. The light baffle 206 may be formed of relatively light gauge sheet metal and is generally rectangular in shape so as to block off most of the opening 36 at the top of the machine 20 when the rotatable cage 24 is in its normal operating and film loading position. The light baffle 206 includes a mounting flange 206c mounted against the portion 44c of the top frame 44, and is held in place by screws threaded into the body of the top frame 44 (FIGS. 9 and 10).

One way in which the amount of light used to expose the film held in the holder 28 may be regulated is by varying the size of the aperture provided by the lens assembly 192. Thus the lens assembly 192 is adjustable by means of a novel diaphragm adjustment mechanism indicated generally in FIG. 7 at 210. Then lens assembly 192 includes a rotatable portion movable in known fashion by a toothed gear 211 and effective to adjust the lens diaphragm and thus change the size of the aperture. The lensboard 186 includes an opposed pair of outwardly extending mounting ears 186c for mounting an opposed pair of lens positioning brackets 212 and 214 held in position by means of fasteners 216. The lens positioning bracket 212 carries a downwardly extending lens control bracket 218 held against the underside of bracket 212 by means of a fastener 220.

In order to allow the operator of the photographic machine to adjust the lens diaphragm from the outside of the machine, the adjustment mechanism 210 includes a diaphragm adjustment shaft 222 extending through a shaft mounting boss 44g in the upper frame 44. In accordance with a feature of the invention, the top frame 44 includes a control panel portion 44h carrying several controls necessary to the operation of the machine 20. A diaphragm adjustment knob 224 is connected to the shaft 222 on the exterior of the upper frame portion 44 and is located on the control panel 44h where it is easily accessible in the normal operating position of the machine. The adjustment shaft 222 is journaled in a pair of bearing assemblies 226 and 227 carried by an adjustment shaft receiving portion 218a of the lens control bracket 218. Between the bearing assemblies 226 and 227 there is mounted a rotatable driving sprocket 228 slidable on but keyed for rotation with the shaft 222. For example, the shaft may include a flat on one side cooperating with a matching surface in the sprocket 228. Thus, although the lensboard 186 may move up and down in a manner to be described, the sprocket 228 may be driven by the shaft 222 in any position of the lensboard 186.

The lensboard 186 includes a pin supporting boss portion 186d carrying a pin 230 upon which is mounted a sprocket 232 driven by the sprocket 228 by means of a driving chain 234. Tension is maintained in the drive chain 234 by means of an idler sprocket 236 mounted upon a pin 238 carried by a boss portion 218b of the lens control bracket 218. The pin 230 additionally caries a spur gear 240 mounted for rotation with the sprocket 232 in meshing relation with the diaphragm gear 211.

Thus it can be seen that when the operator rotates the shaft 222 by means of the knob 224, rotation of the sprocket 228 causes rotation of the driven sprocket 232 which in turn causes the gear 240 to turn the gear 211 in order to vary the size of the aperture of the lens assembly 192. A pointer 242 carried by the knob 224 cooperates with suitable markings upon a face plate 244 on the top surface of the top frame 44 in order to indicate to the operator the size of the lens aperture.

It is desirable in photographic machines such as the machine 20 to be able to make either enlarged or reduced size copies of an item to be copied. For example, it would be desirable to be able to produce a copy ranging from one half to twice the size of the original item. In order to produce copies of varying size it is necessary to vary the distance between the item to be copied, held in the copyboard 30, and the film held in the film holding assembly 28. Thus as the distance between the film to be exposed and the item to be copied decreases, the size of the resulting copy as compared with the original item increases.

In past photographic machines, this distance variation is accomplished by simultaneously moving the film and the copied item toward and away from one another. This has been necessary, in part, in order to maintain the balance of heavy and bulky rotating supporting structures, and requires relatively complex mechanical arrangements.

In accordance with a feature of the present invention, the photographic machine 20 is provided with a copyboard positioning mechanism generally indicated as 250 for adjusting only the position of the copyboard 30 in the rotatable cage 24, the film remaining in a fixed position on the cage. Since the position of the mounted film to be exposed is fixed with respect to the rotatable cage 24, it will be seen that the copyboard positioning mechanism 250 is capable of producing variations in the size of the copy to be made. Furthermore, the copyboard positioning mechanism 250 is arranged so that the operator may alter the position of the copyboard merely by turning an easily accessible copyboard positioning hand wheel control 252, having a cranking knob 252a, mounted externally of the machine on the control panel 44h when the rotatable cage 24 is in its normal position.

In accordance with a feature of the invention both the lensboard 186 and the copyboard 30 are mounted in the cage structure 24 for movement toward and away from the film in a novel fashion whereby they are maintained precisely parallel with the film in order to reduce distortion. As previously described, the copyboard 30 is mounted upon a pair of copyboard supports 88 and 90. The supports 88 and 90 include elongated tabular mounting portions 88a and 90a carrying slide bearings 251 and 253 (FIG. 7) slidably mounted upon a pair of positioning and support rods 254 and 256 arranged respectively at the front and back of the machine 20. The rods 254 and 256 are mounted in a manner quite similar to the mounting of the four corner support tubes 46, 48, 50 and 52, being mounted respectively to lower support frame 40, the center frame 42 and the top frame 44. Thus the rods 254 and 256 form an additional part of the extremely rigid and stable rotatable cage assembly 24. Furthermore, these rods, as well as the slide bearings 251 and 253 are carefully machined to be perfectly straight and round. In this manner, it is assured that the item to be copied held in the copyboard 30 will always remain parallel with the film mounted in the film holding assembly 28 to the end that high quality reproductions are obtainable regardless of the position of the copyboard 30.

Adjustment of the position of the copyboard 30 is accomplished through rotation of a copyboard adjustment shaft 258 (FIG. 4) to which the positioning knob 252 is attached. The shaft 258 is mounted for rotation in a boss located beneath the control panel portion 44h of the top frame 44, and includes a relatively small diameter portion 258a extending between the top frame 44 and the center frame 42. Furthermore, the shaft 258 includes a larger diameter threaded portion 258b extending between the center frame 42 and the bottom frame 40. The copyboard support 88 includes an adjustment leg 88b (FIG. 4) holding an internally threaded grommet 260 which is threadedly engaged with the threaded portion 258b of the adjustment shaft 258. Thus, it can be seen that when the shaft 258 is rotated, the adjustment leg 88b of the copyboard support 88 urges the copyboard support 88 and the copyboard 30 upwardly or downwardly depending upon the direction of the rotation.

In order that the copyboard be moved smoothly by forces provided at two sides thereof, the copyboard support 90 also includes an adjustment leg 90b (FIG. 6) carrying a second internally threaded grommet 262 engaging a second copyboard adjustment shaft 264 extending between and mounted for rotation in the center frame 42 and the lower frame 40 of the cage 24. The second adjustment shaft 264 is driven from the manually rotated adjustment shaft 258 by means of a drive chain 266 (FIG. 8) engaging sprockets 268 and 270 on the respective shafts 258 and 264 and located immediately beneath the center frame 42. The drive chain 266 additionally engages a pair of idler sprockets 272 and 273 carried by a pair of mounting pins 274 and 275 mounted beneath the center frame 42 whereby the drive chain follows a parallelogram-shaped path (see FIG. 8) in order that the drive chain not obstruct the space between the camera lens assembly 192 and the item to be copied held in the copyboard 30.

When it is desired to change the position of the copyboard 30, the operator rotates the handwheel 252, thus causing the shaft 258 to rotate. This results in a movement of the driving chain 266 around the driving sprocket 268 and the three additional sprockets 270, 272, and 273. Thus, the driving chain assures that the shafts 264 and 258 will rotate simultaneously. Due to the adjustment legs 88b and 90b and the internally threaded grommets 260 and 262 carried thereby, the copyboard supports 88 and 90 will be moved in order to move the copyboard 30 to the desired position to achieve enlargement or reduction.

Since the position of the item to be copied held in the copyboard 30 may be varied by the copyboard positioning mechanism 250, it is necessary to focus the camera 26 to obtain sharp well-focused reproductions at various positions of the copyboard 30. Accordingly, a focusing mechanism generally indicated as 280 (FIG. 5) is provided in order to change the position of the lensboard 186 to the position of sharpest focus corresponding to any position of the copyboard 30.

In accordance with a feature of the present invention, the photographic machine 20 includes a focusing handwheel control 282 on the control panel 44h and thus conveniently exposed at the top of the machine when the rotatable cage 24 is in its normal operating position. The operator may focus the machine by rotating the focusing knob 282, which includes an upwardly extending crank handle 282a. Rotation of the knob 282 causes movement of the lensboard 186, and thus of the lens assembly 192. The lensboard 186 is supported by the lens positioning brackets 212 and 214 as previously described, and the positioning brackets 212 and 214 include tubular mounting portions 212a and 214a (FIG. 7) carrying carefully machined slide bearings 283 and 285 which are in slidable engagement with the positioning and support rods 254 and 256 between the center frame 42 and the top frame 44, so that the lens board 186 and the lens assembly 192 are maintained parallel with the film held in the film holding assembly 28 regardless of the vertical position of the lens assembly 192 as adjusted by the operator.

The focusing knob 282 is connected to a focusing shaft 284 (FIG. 10) mounted for rotation in the center frame 42 and in a boss beneath the control panel 44h of the top frame 44. The positioning bracket 212 includes an adjustment leg 212b carrying an internally threaded grommet 286 threadly engaged with the threaded focusing shaft 284 to the end that rotation of the shaft 284 will induce upward or downward movement of the positioning bracket 212. Similarly, the bracket 214 includes a leg 214b carrying another internally threaded grommet 286 (FIG. 6) threadedly engaged with a second focusing shaft 288 mounted at the back of the photographic machine 20 for rotation between the center frame 42 and the top frame 44. The second shaft 288 is driven from the shaft 284 by means of a drive chain 290 carried by sprockets 292 and 294 mounted on the shafts 284 and 288 below the center frame 42. The drive chain 290 also engages a pair of idler sprockets 296 and 298 carried by mounting pins 300 and 302 mounted below the center frame 42 in order that the drive chain 290 will move around a generally parallelogram-shaped path slightly offset from the path of the copyboard positioning drive chain 266 described above (FIG. 8).

Rotation of the focusing knob 282 will accordingly cause simultaneous rotation of the two focusing shafts 284 and 288. This simultaneous rotation will cause movement of the lens positioning bracket 212 or 214 upwardly or downwardly depending upon the direction of rotation. Thus the lensboard 186 and the lens assembly 192 carried thereby will be moved upwardly and downwardly as desired by equal forces applied at opposite sides of the lens mounting bracket, and furthermore, will remain constantly parallel with the item to be copied and the film or negative to be exposed.

In accordance with a feature of the present invention, the photographic machine 20 is provided with a copyboard position indicator generally indicated at 308 (FIG. 9) and a focusing indicator generally indicated at 310 (FIG. 10) for indicating to the operator the position of the copyboard 30 and the position of the lens assembly 192 mounted on the lens supporting bracket 186.

The copyboard position indicator 308 includes a transparent view plate 312 mounted to the normally convenient control panel portion 44h of the top frame 44 by means of a pair of fasteners 314. Hair lines 316a and 316b are marked upon the upper and lower surfaces of the view plate 312 in order to allow the operator accurately to appraise the position of the copyboard 30. The position indicator 308 also includes a flexible tape or strip 318 having marked thereon a series of suitable indications appearing under the transparent view plate 312 in accordance with the position of the copyboard 30.

In order to move the flexible tape 318 in accordance with the movement of the copyboard 30, a tape support bar 320 is mounted upon the copyboard support 88 in a normally horizontal and outwardly extending position. A tape mounting bracket 322 of generally U-shape and having spaced legs 322a and 322b is mounted by means of fasteners 323 to the end of the tape support bar 320 spaced from the copyboard support 88. A pair of threaded screws 324 and 325 are mounted in the legs 322a and 322b of the bracket 322 and are held in position by means of a pair of nuts 326 and 327. The opposite ends of the tape 318 carry a pair of L-shaped flanges 328 and 329 held to the tape by means of rivets 330 and 331. The L-shaped flanges 328 and 329 are mounted in fixed position with respect to the copyboard support 88 by means of adjustment nuts 332 and 333 threaded onto the threaded screws 324 and 325. Proper alignment and tensioning of the tape 318 may be accomplished by adjustment of the nuts 332 and 333.

The tape 318 is mounted for movement along a path through the rotatable cage 24 by means of a bracket 334 mounted to the lower frame 40 by means of a pair of fasteners 335. The bracket 334 includes a pair of spaced legs 334a and 334b mounting between them an axle 336 on which is mounted for rotation a lower tape roller 338. Similarly mounted to the top frame 44 by means of fasteners 342 is a bracket 340 having a pair of spaced leg 340a and 340b. An axle 344 mounted between the legs 340a and 340b supports an upper tape roller 346. The tape extends from the copyboard support 88 around the upper and lower rollers 338 and 346. Thus when the copyboard 30 is moved upwardly or downwardly by means of the copyboard positioning mechanism 250, the tape moves over the upper roller 346. The markings on the surface of the tape 318 provide an indication through the view plate 312 of the exact position of the copyboard 30. For example, in a device constructed in accordance with the invention the tape surface contains markings running sequentially between 50% and 200%, the markings corresponding to relative size of the copies produced as compared with the size of the item copied.

The focusing indicator 310 is quite similar in construction to the copyboard position indicator 308 and includes a transparent view plate 350 mounted on the control panel portion 44h of the top frame 44 by means of a pair of fasteners 352 and includes on its top and bottom surfaces a pair of hairlines 354a and 354b. A flexible take 356 indicating the position of the lens assembly 192 is visible through the view plate 350.

In order to mount the flexible tape 356, a tape support bar 358 is mounted to the lensboard 186 and extends outwardly therefrom. The end of the bar spaced from the lens support bracket 186 carries a tape mounting bracket 360 having a pair of spaced legs 360a and 360b carrying a pair of screws 362 and 363 held in place by nuts 364 and 365. The opposite ends of the flexible tape 356 carry a pair of L-shaped flanges 366 and 367 held in place by means of rivets 368 and 369. The flanges 366 and 367 are mounted in fixed position with respect to the lens assembly 192 by means of a pair of adjustment nuts 370 and 371 mounted on the screws 362 and 363. Proper alignment and tensioning of the flexible tape 356 may be accomplished through adjustment of nuts 370 and 371.

The tape is supported for movement in the rotatable cage assembly 24 by means of a lower bracket 372 held to the center frame 42 by means of fasteners 374. The bracket 372 includes a pair of spaced legs 372a and 372b mounting therebetween an axle 376 upon which is mounted a lower roller 378. An upper bracket 380 is mounted to the underside of the top frame 44 by means of fasteners 382 and includes spaced legs 380a and 380b. An axle 384 is mounted between the spaced legs and carries an upper roller 386. The tape extends from the L-shaped flanges 366 and 367 around the upper and lower rollers 386 and 378, with the part of the flexible tape 356 visible in the view plate 350 depending upon the position of the lens assembly 192.

It will be understood that for each position of the copyboard 30, there exists a position of the lens assembly 192 providing for optimum focusing. Thus, in accordance with a feature of the invention, the flexible tape 356 is provided with markings cooperating with the markings on the positioning tape 318 for properly and directly focusing the lens assembly 192 for each copyboard position. In a device constructed in accordance with the invention, the flexible tape 356 is provided with sequential markings running from 50% to 200% and similar to the markings on the position tape 318. Furthermore the markings on the focusing tape 356 are arranged and spaced so that for each indicated copyboard position, such as for example "150%," an identical marking, i.e., "150%" appears on the focusing tape when the lensboard 186 is in the properly focused position. In operation, the copyboard 30 is initially positioned by means of the markings on the flexible tape 318, in order to obtain the desired size reduction or enlargement. Then the lens assembly 192 is positioned for proper focusing simply by matching the markings on the lensboard positioning tape 356 with the markings on the copyboard positioning tape 318.

Figure 12:
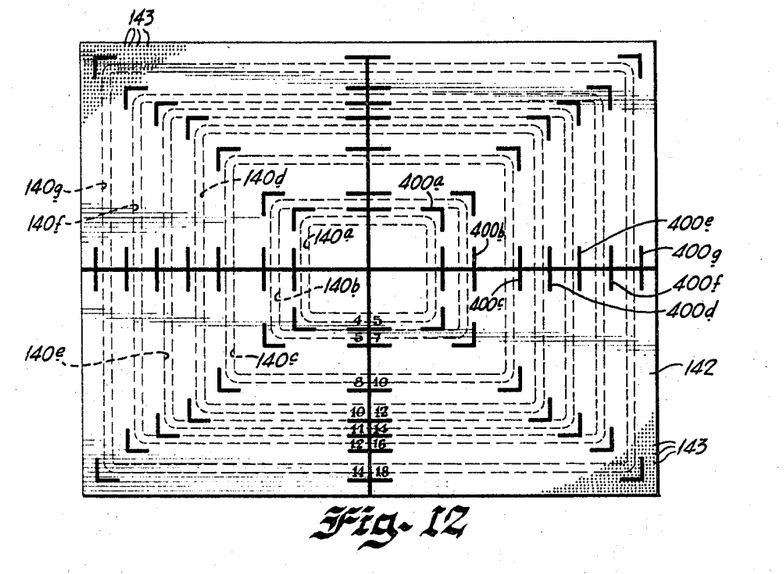
FIGURE 12 is an enlarged plan view of the vacuum plate of the photographic machine of FIGURE 1.
Figure 13:
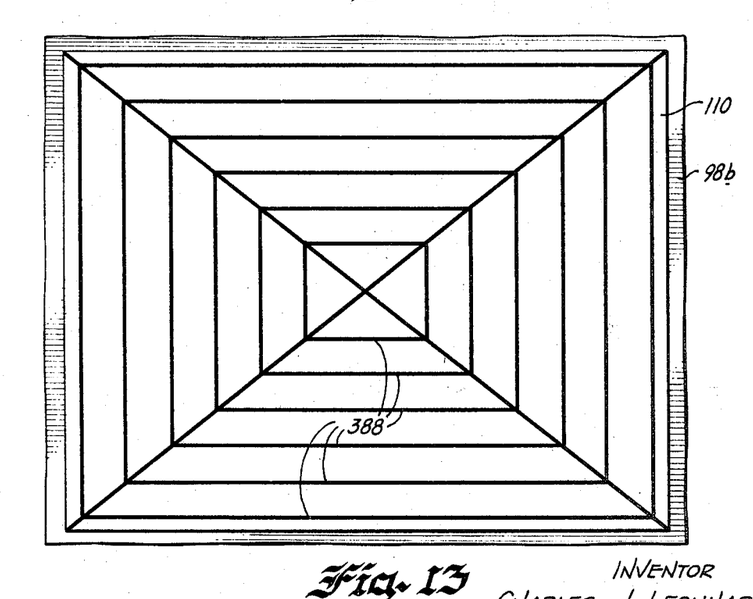
FIGURE 13 is an enlarged plan view of the pressure back of the photographic machine of FIGURE 1.

Having reference now to FIGS. 12 and 13, the vacuum plate portion of the film holding assembly 28 and the pressure back portion 110 of the copyboard assembly 30 are shown respectively in plan views. The pressure back 110 is provided with a series of parallel-sided rectangular markings 388 arranged in graduated size. When an item to be copied is placed in the copyboard 30, the markings 388 are helpful in centering the item to be copied. The vacuum plate 142 is provided with markings 400a, 400b, 400c, 400d, 400e, 400f, and 400g outlining a series of parallelograms corresponding to commonly used film sizes ranging from 4 x 5 inches to 14 x 18 inches. These markings aid in positioning the film in the film holding assembly 28 and also provide an indication of the proper setting of the vacuum control valve 146.

The control pedestal portion 34b of the top cabinet 34 includes a left-hand face plate 402, and similarly the control pedestal portion 34c includes a right-hand face plate 404. In addition to the rotatable cage position switch 84, the left-hand face plate 402 also carries a master power switch 406 and a vacuum controlling switch 408. Mounted upon the right-hand face plate 404 are a pair of switches for controlling the camera shutter and the lights in the light housings 194. A focusing switch 410 may be used to place the photographic machine 20 in a focusing condition by opening the shutter and turning on the lights in order that, if desired, the camera may be focused on a ground glass (not shown) placed on the ledge 44e when the vacuum cover 122 is raised. A reset timer switch 412 is used to control the light and the shutter for exposing a film from an item to be copied for a predeterminable period of time, in a manner known to those skilled in the art.

In view of the preceding detailed description, operation of the photographic machine 20 will be apparent. When it is desired to photograph an item to be copied, the master switch 406 is turned to the on position in order to connect the machine with a source of electric power. In order to mount the item to be copied in the machine, the position control switch 84 is actuated in order to place the rotatable cage in the copyloading position shown in FIG. 2, wherein the copyboard 30 is accessible to the operator. The copyboard 30 is then rotated so that the lid 184 is facing upwardly. The lid is then opened and the item to be copied is placed against the pressure back 110, and centered by means of the markings 388. The lid 104 then is closed and the copyboard is rotated to the operating position. The positioning control switch 84 is then again actuated to return the rotatable cage 24 to its film loading and operating position shown in FIGS. 1 and 3–8.

The size of the copy to be made as compared with the size of the original item to be copied is determined by positioning the copyboard 30 by rotating the hand wheel 252 until the desired size, as indicated on the flexible tape 318, is selected. Then the lensboard 186 is positioned by means of the hand wheel 282 in accordance with markings on the tape 356 in order to focus the camera. Film is then loaded into the vacuum cover 122 by first energizing the vacuum pump by means of the vacuum switch 408 and setting the vacuum valve 146 by means of the handle 172 to the proper film size as indicated by the markings 400a–400g on the vacuum cover. The film is then placed against the vacuum cover and centered in accordance with the markings 400a–400g, where it is held firmly in place by means of the vacuum applied to the back side of the vacuum cover. It will be understood that through the use of the vacuum valve 146, vacuum is only applied to the portion of the vacuum plate 142 which lies beneath the film. When the vacuum cover 122 has been closed and latched in place, the desired exposure may be made by means of the reset timer switch 412. When the switch 412 has been set for a desired amount of time in order to properly expose the film, and the aperture control has been set to the desired aperture by means of the handle 224, a switch button 412a may be depressed in order to turn on the lights and open the shutter for the desired time interval, thus exposing the film. Subsequently, the film may be removed for processing by opening the vacuum cover 122 and turning off the vacuum by means of a switch 408.

From the above it will appear that operation of the machine is quite simple and rapid as compared with prior machines because of the convenient positioning of controls and because fo the ease and convenience of copy loading and film loading.

While there has been shown and described a particular embodiment of the present invention, it will be apparent to those skilled in the art that various changes and modifications may be made without departing from the invention in its broader aspects, and it is therefore contemplated in the appended claims to cover all such changes and modifications as fall within the true spirit and scope of the invention.

What is claimed as new and desired to be secured by Letters Patent of the United States is:

1. A photographic machine for exposing film to a light image in accordance with an item to be copied, said machine comprising fixed supporting means, a rigid cage framework including first and second generally rectangular end frames at first and second ends of said cage framework and a generally rectangular central frame disposed between said end frames, four tubular supports extending along the corners of said cage framework and rigidly secured to the corners of said end and central frames, said frames and supports defining a central space within said cage framework, means interconnecting said central frame and said supporting means for rotation of said cage framework between copy loading and film loading positions, said first end frame defining an enlarged opening, a camera arranged in said central space and including film holding means for holding film over said enlarged opening in a fixed position with respect to said cage framework, copy holding means for holding an item to be copied mounted between said central frame and said second end frame for movement toward and away from said film holding means to vary the size of the light image, a camera lens, and lens mounting means mounted between said first end frame and said central frame for movement with respect to said cage framework toward and away from said film holding means to focus said light image.

2. The photographic machine of claim 1 wherein said first and second end frames and said central frame are formed of unitary aluminum castings.

3. The photographic machine of claim 1, said copy holding means and said lens mounting means each including slide bearing means encircling all of said tubular supports for four-point sliding support of said copy holding means and lens mounting means during movement thereof.

4. The photographic machine of claim 3, a panel on said cage framework, a plurality of threaded lens position control shafts in spaced relation about said lens and mounted parallel with said supports for rotation in said framework, one of said lens position control shafts terminating near said panel, a lens position control knob connected to said one lens position control shaft and mounted on said panel for rotating said one lens position control shaft, means interconnecting said plurality of lens position control shafts for simultaneous rotation, and internally threaded means on said lens mounting means engaging said lens position control shafts for linear movement of said lens mounting means and of said lens in response to rotation of said lens position control shafts to focus said light image.

5. The photographic matchine of claim 3, a panel on said framework, a plurality of threaded copy position control shafts mounted parallel to said supports for rotation in said framework, one of said copy position control shafts terminating near said panel, a copy position control knob connected to said one copy position control shaft and mounted on said panel for rotating said one copy position control shaft, means interconnecting said plurality of copy position control shafts for simultaneous rotation, and internally threaded means on said copy holding means engaging said copy position control shafts for linear movement of said copy holding means in response to rotation of said copy position control shafts to vary the size of said light image.

6. The photographic machine of claim 3, said supporting means comprising a housing having an aperture in the top thereof, said cage framework including a panel disposed at said aperture in the film loading position of the cage framework, a plurality of lens position control shafts in spaced relation about said lens and mounted parallel to said supporting bars, means connecting said lens position control shafts for simultaneous rotation, internally threaded means on said lens mounting means engageable with said lens position control shafts for movement of said lens mounting means in response to rotation of said lens position control shafts, a plurality of threaded copy position control shafts mounted parallel to said supporting bars, means connecting said copy position control shafts for simultaneous rotation, internally threaded means on said copy holding means engageable with said copy position control shafts for movement of said copy holding means in response to rotation of said copy position control shafts, one of said lens position control shafts and one of said copy position control shafts extending to a region adjacent said panel, and a pair of manual control elements on said panel and connected to said extending shafts for rotating said extending shafts thereby to adjust said copy holding means and lens.

7. The photographic machine of claim 6, first and second indicator means on said panel for indicating the positions of said copy holding means and lens mounting means respectively, and markings on said first and second indicators providing similar indications when said lens is in its properly focused position.

8. A photographic machine for exposing film with a light image in accordance with an item to be copied, said machine comprising:
a housing including an opening;
a main casing mounted within said housing;
a camera assembly supported on said main casing and including film holding means and copy holding means disposed near opposite ends of said main casing;
means mounting said main casing for rotation within said housing between a film loading position wherein said film holding means is at said opening and a copy loading position wherein said copy holding means is at said opening;
said copy holding means comprising a copyboard casing including backing means for supporting the item to be copied and a transparent cover hinged to said copyboard casing for holding the item against said backing means;
and means mounting said copyboard casing for rotation with respect to said main casing when said main casing is in said copy loading position between a loading position and a copy making position.

9. The photographic machine of claim 8, said backing means comprising a layer of deformable elastomeric material.

10. The photographic machine of claim 8, said film holding means including a vacuum cover hinged on said main casing, a perforated plate at the underside of said vacuum cover, and means for applying a vacuum behind said plate.

11. In photographic apparatus for exposing film to a light image in accordance with an item to be copied, the combination of a rigid supporting framework, a control panel on said framework, a camera lens having an adjustable diaphragm, mounting means for said camera lens, a plurality of parallel threaded lens position control shafts in spaced relation about said lens and mounted for rotation in said framework, one of said shafts terminating near said control panel, a lens position control knob connected to said one shaft and mounted on said control panel for rotating said one shaft, means interconnecting said plurality of control shafts for simultaneous rotation, internally threaded means on said lens mounting means engaging said control shafts for linear movement of said lens mounting means and of said lens on a line parallel to said control shafts in response to rotation of said shafts, diaphragm adjustment linkage means mounted on said lens mounting means and including a drive sprocket, a diaphragm adjustment shaft keyed to rotate with said sprocket and to slide through said sprocket as said lensboard is moved, said adjustment shaft being mounted for rotation in said framework and terminating adjacent said control panel, and a diaphragm adjustment knob connected to said adjustment shaft for adjustment of said diaphragm in any position of said lens.

12. A photographic machine for exposing film to a light image in accordance with an item to be copied, said machine comprising supporting means, first and second generally rectangular spaced end frames and a generally rectangular central frame disposed between said end frames, supporting tubes interconnecting the corners of said end and central frames, said frames and tubes forming a rigid cage framework defining a central space therein, means interconnecting said central frame and said supporting means for rotation of said cage framework between copy loading and film loading positions, said first end frame including a control panel portion and defining an enlarged opening, a camera arranged in said central space and including film means for holding film over said enlarged opening in a fixed position with respect to said cage framework, copy holding means for holding an item to be copied mounted between said central frame and said second end frame for movement toward and away from said film holding means to vary the size of the light image, a camera lens including an adjustable diaphragm, lens mounting means, a plurality of threaded lens adjustment shafts mounted for rotation between said first end frame and said central frame and arranged in spaced relation around said lens, internally threaded means on said lens supporting means in engagement with said adjustment shafts, means including a lens position control on said control panel for rotating a first of said adjustment shafts, interconnecting means for rotating the others of said plurality of adjustment shafts simultaneously with said first shaft to move said lens toward and away from said film holding means for focusing the light image and to maintain said lens parallel with film held over said enlarged opening, a diaphragm adjustment shaft extending into said central space and mounted for rotation in said control panel portion of said first end frame, driving means mounted on said lens supporting means for adjusting said diaphragm and including a drive sprocket slidably mounted on and keyed for rotation with said shaft, and diaphragm control means on said control panel for rotating said shaft to adjust said diaphragm in any lens position.

13. In photographic apparatus for exposing film to a light image in accordance with an item to be copied, the combination of a rigid supporting framework, a control panel on said framework, a camera lens having an adjustable diaphragm, mounting means for said camera lens, a plurality of parallel threaded lens position control shafts in spaced relation about said lens and mounted for rotation in said framework, one of said lens position control shafts terminating near said control panel, a lens position control knob connected to said one lens position control shaft and mounted on said control panel for rotating said one lens position control shaft, means interconnecting said plurality of lens position control shafts for simultaneous rotation, internally threaded means on said lens mounting means engaging said lens position control shafts for linear movement of said lens mounting means and of said lens in a direction parallel to said lens position control shafts in response to rotation of said lens position control shafts to focus said light image, diaphragm adjustment drive means mounted on said lens mounting means and including a drive sprocket, a diaphragm control shaft keyed to rotate with said sprocket and to slide through said sprocket as said lens mounting means is moved, said adjustment shaft being mounted for rotation in said framework and terminating adjacent said control panel, a diaphragm adjustment knob connected to said adjustment shaft for adjustment of said diaphragm in any position of said lens, copy holding means for holding an item to be copied, a plurality of threaded copy position control shafts parallel to said lens position control shafts and mounted for rotation in said framework, one of said copy position control shafts terminating near said control panel, a copy position control knob connected to one copy position control shaft and mounted on said control panel for rotating said one copy position control shaft, means interconnecting said plurality of copy position control shafts for simultaneous rotation, and internally threaded means on said copy holding means engaging said copy position control shafts for linear movement of said copy holding means in a direction parallel to said control shafts in response to rotation of said copy position control shafts to vary the size of said light image.

References Cited

UNITED STATES PATENTS

| | | | |
|---|---|---|---|
| 1,834,897 | 12/1931 | Caps | 88—24 |
| 2,786,384 | 3/1957 | Guppy | 88—24 |
| 3,077,141 | 2/1963 | Wanielista et al. | 88—24 |

NORTON ANSHER, *Primary Examiner.*

W. A. SIVERTSON, *Assistant Examiner.*